June 6, 1961

J. CHOMA 2,987,010

CARRIER STOP

Filed Jan. 7, 1959

2 Sheets-Sheet 1

INVENTOR.
Joseph Choma.
BY
Harness, Dickey & Pierce
ATTORNEYS.

June 6, 1961
J. CHOMA
2,987,010
CARRIER STOP
Filed Jan. 7, 1959
2 Sheets-Sheet 2
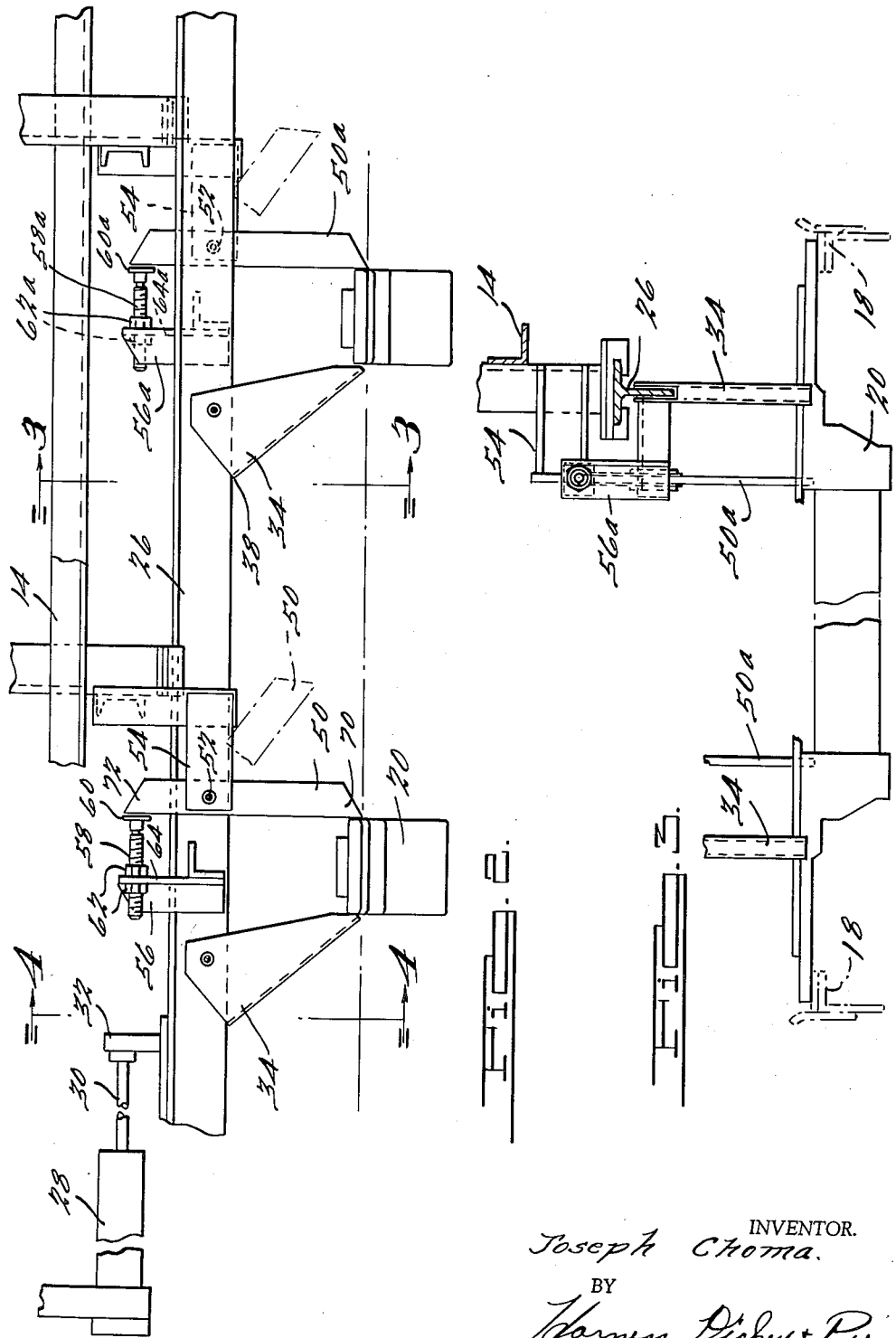
INVENTOR.
Joseph Choma.
BY
Harness, Dickey & Pierce
ATTORNEYS.

United States Patent Office 2,987,010
Patented June 6, 1961

2,987,010
CARRIER STOP
Joseph Choma, Roseville, Mich., assignor to The Udylite Corporation, Detroit, Mich., a corporation of Delaware
Filed Jan. 7, 1959, Ser. No. 785,477
8 Claims. (Cl. 104—162)

This invention relates generally to material handling and treating apparatus of the type which utilizes work carriers movably supported on horizontal supporting surfaces, and more particularly to stop means on this type of apparatus for positively stopping a carrier in a predetermined moved position.

Material handling apparatus of the above type usually consists of a frame and material treatment tanks arranged in one or more rows below parts of the frame. Some machines use a single work supporting rail and others use a pair of horizontal rails located above each row of tanks. Carriers supporting workpieces are slidably supported on the rails for movement through the treating fluids in the tanks. Horizontally movable pusher dogs are provided for engaging the carriers and moving them horizontally along the rails. An example of a single rail machine is shown in Davis Patent No. 2,591,682, and a double rail machine is shown in application Serial No. 802,797, filed March 30, 1959 owned by the assignees of this invention.

Since it is advantageous from a production standpoint to have the carriers move as fast as possible through the apparatus, there is a possible tendency for the carriers to travel past their desired stop positions. In some instances stopping of a carrier in a specific position is essential to a particular part of the machine operation and as the speed of travel of the carriers in the machine is increased, this over-travel problem becomes greater. This invention provides carrier stop apparatus which is mounted on the frame for engagement with a carrier to positively prevent movement of the carrier past a predetermined stop position.

An object of this invention, therefore, is to provide improved carrier stop means for material handling apparatus.

A further object of this invention is to provide a carrier stop apparatus which is positive in action and which is economical to construct and install.

Figure 1:
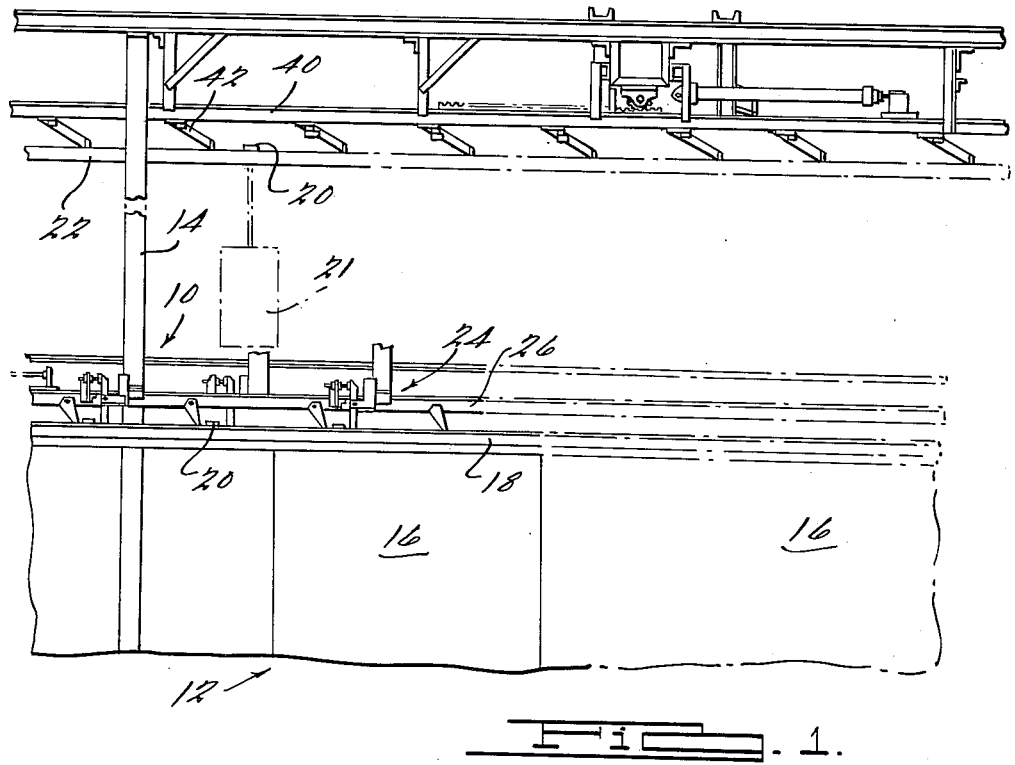
Figure 4:
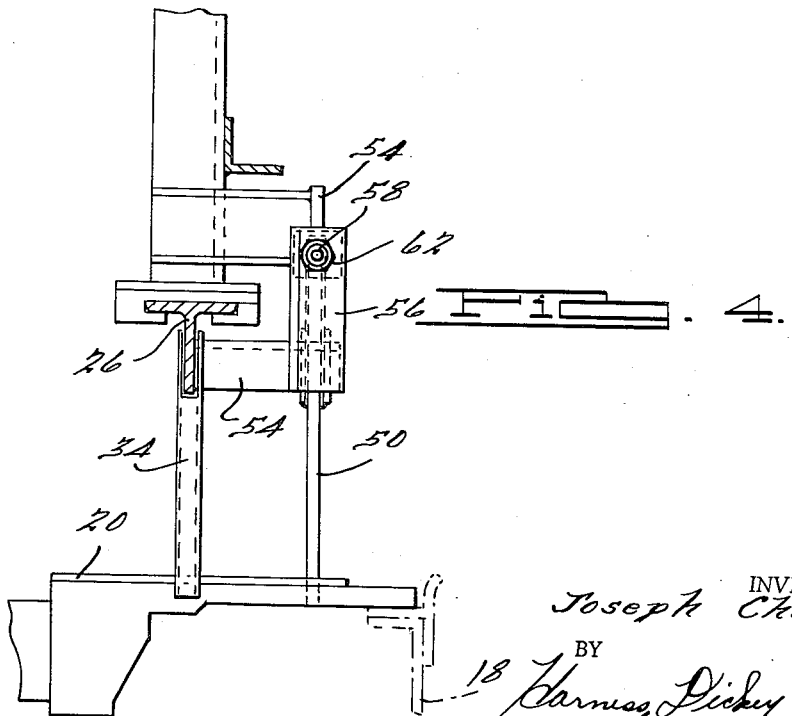

Further objects, features and advantages of this invention will become apparent from a consideration of the following description, the appended claims and the accompanying drawing in which:

FIGURE 1 is a side elevational view of a material handling machine of the type having carrier pusher mechanisms, showing the carrier stop apparatus of this invention in assembly relation with the machine;

FIGURE 2 is an enlarged side elevational view of a portion of the machine shown in FIG. 1; and FIGURES 3 and 4 are transverse sectional views looking along the lines 3—3 and 4—4, respectively, in FIG. 2.

With reference to the drawing, the carrier stop apparatus of this invention indicated generally at 10, is illustrated in FIG. 1 mounted on a material handling machine 12 of a type which is adapted for particular use in processes such as plating, anodizing, and the like. The machine 12 includes a main frame 14 which extends above a series of liquid treatment tanks 16 which are arranged in one or more rows. Arranged above the tanks 16 are a pair of work-supporting rails 18 (FIG. 3) which extend longitudinally of at least one row of tanks 16. The rails 18 support a plurality of work carriers 20, the number depending upon the number of parts being processed at any one time in the machine 12, and each carrier 20 extends between the pair of rails 18 on which it is supported. When a work carrier 20 is supported on the rails 18 above a particular tank 16, the work on that carrier 20, hangs downwardly into the liquid in that tank 16. During transfer of the work from one tank 16 to another tank 16, the carrier is lifted off the rails 18 to a supported position on a second pair of rails 22 located above the rails 18 whereby the work, indicated diagrammatically at 21 in FIGURE 1, is raised to the elevated position shown so that it can be transferred over a partition separating adjoining tanks 16. A chassis (not shown) lifts the carrier 20 from the rails 18 onto the rails 22.

When the carrier 20 is supported on the rails 18, the work 21 is suspended in the liquid in a tank 16 and is advanced through the tank by the action of a pusher mechanism 24 mounted on the frame 14. The pusher mechanism 24 consists of two pusher bars 26, corresponding to the rails 18 and only one of which is shown, which are slidably supported on the frame 14 for reciprocating movement relative to the fixed rails 18. The pusher bars 26 are reciprocated by a hydraulic cylinder assembly 28 (FIG. 2) which has a piston rod 30 connected by a block 32 to one of the pusher bars 26, which are connected so that they move in unison. Each pusher bar 26 carries a plurality of pivotally supported depending pusher dogs 34 each of which extends downwardly to a position adjacent the corresponding rail 18 for engagement with the rear side of a carrier 20 supported thereon. The dogs 34 are arranged in the same pattern on each bar 26 so that they are positioned in pairs for engagement with opposite ends of the carriers 20 as shown in FIG. 3.

When the pusher bars 26 are moved in one direction, namely, toward the right in the machine illustrated in FIG. 1, the pusher dogs 34 engage the carriers 20 and slide them toward the right on rails 18. As illustrated in FIG. 2, each dog 34 has an upper end portion 38 engageable with the pusher bar 26 for preventing swinging movement of the dog 34 in a clockwise direction past the position illustrated in full lines. As a result, each dog 34 remains in a fixed position relative to rod 26 during movement of the pusher rod 26 toward the right. When the piston rod 30 is retracted so that the pusher bars 26 are moved toward the left in FIG. 1, the pusher dogs 34 readily pivot in a counterclockwise direction as viewed in FIG. 2 so that they move across the carrier 20 without causing any movement of the carrier on the rails 18.

Similar pusher bars 40 and dogs 42 are provided for advancing the carriers 20 on the upper rails 22. Certain operation of the machine 12 may be dependent on the stopping of the carriers 20 in predetermined stop positions on the rails 18 and 22. Since the production capacity of the machine is increased by an increase in the rate of travel of the carriers 20 on the rails 18 and 22, there is a tendency for a carrier 20 to continue its travel after contact with that carrier by its pusher dog 34 is discontinued. Consequently, the carrier stop apparatus 10 is provided at certain selected points on the machine 12 for insuring a stopping of each carrier 20 in preselected positions. The apparatus 10 is illustrated applied to a lower pusher bar 26 but it is to be understood that this is for illustration purposes only since the apparatus 10 is readily applied to the upper pusher bars 40.

The carrier stop apparatus 10 of this invention consists of pivoted stop members 50 and 50a, each of which is mounted for rotation about a substantially horizontal pivot member 52 carried by an extension member 54 mounted on the machine frame 14. The stop members 50 and 50a are arranged in pairs adjacent to the pusher bars 26 (only one of which is shown) so that a pair of stop members 50 or 50a will simultaneously engage opposite ends of a carrier 20, as illustrated in FIG. 3. In the embodiment shown in FIGS. 3 and 4, one of the extension members 54 is mounted on one side of the illustrated pusher bar 26 and the other extension member 54 is mounted on the opposite sides of the pusher bar 26. This arrangement of adjacent extension members 54 on opposite sides of the pusher bar 26 is required only in situations in which the paths of travel for the dogs 34 corresponding to the illustrated stop members 50 and 50a overlap. In such situations arrangement of adjacent extension members 54 and stop members 50 and 50a on opposite sides of the pusher bar 26 is necessary to prevent contact of one stop member actuating structure with an adjacent stop member. Since the operating structure associated with each of the stop members 50 and 50a is substantially the same, only the structure associated with the member 50 is described in detail, with like structure for the stop member 50a being indicated by like numerals with the letter suffix "a."

Mounted on the pusher bar 26 at a location adjacent one of the illustrated pusher dogs 34 is an upright frame member 56 which supports a substantially horizontal threaded stud 58 provided at its forward end with an abutment plate 60. The abutment plate 60 is horizontally spaced from the corresponding pusher dog 34 in a direction corresponding to the direction of movement of the pusher bar 26 to advance a carrier 20 on the rails 18. This spacing is adjustable by manipulation of a pair of stop nuts 62 on the stud 58 which engage opposite sides of a vertical flange 64 on the frame member 56 and hold the stud 58 in an adjusted position.

In the operation of the carrier stop apparatus 10, the pusher dog 34 which is positioned adjacent the abutment plate 60 is moved, on extension of the piston rod 30, into engagement with one end of a work carrier 20 and a corresponding pusher dog 34 is moved into engagement with the opposite end of the carrier 20 so that when the pusher bars 26 are moved further in an advancing direction, the carrier 20 is moved along the rails 18. When the forward movement of the pusher bars 26 is terminated, the carrier 20 may, by virtue of its own inertia, have a tendency to continue its advancing movement for a short distance. To eliminate this continued movement, the pair of stop members 50 are mounted on the pusher bars 26 so that the lower end 70 of each stop member 50 will engage one end of the work carrier 20. This engagement of the stop members 50 with the carrier 20 will prevent further movement of the carrier 20 unless the stop member 50 is permitted to rotate in a counterclockwise direction as viewed in FIG. 2. To prevent this rotation, the abutment plate 60 is located so that it will engage the upper end 72 of the stop member 50 to hold the stop member 50 in the vertical position illustrated in FIG. 2 at the time the lower end of the stop member 50 is contacted by a carrier 20. The abutment plate 60 is adjustable to insure its engagement with the stop member 50 in the desired position of the stop member 50.

When the piston rod 30 is retracted so that the pusher bars 26 are moved toward the left as viewed in FIG. 2, a pair of pusher dogs 34 move rearwardly to positions behind the carrier 20 which was last stopped by the stop members 50 so that on the next extension of the piston rod 30, the carrier 20 will be advanced. During retraction of the piston rod 30, the dogs 34 merely move across the top side of the carrier 20 and when the carrier 20 is advanced, the stop members 50 rotate in a counterclockwise direction to their broken line positions illustrated in FIG. 2 since the abutment plates 60 which were maintaining the stop members 50 in vertical positions were retracted along with the pusher bars 26.

Since the abutment plate 60a is moved rearwardly to a position past the plane of the stop member 50, it is located on the opposite side of the pusher bar 26 so that these two parts will not collide.

From the above description, it is seen that this invention provides stop members 50 and 50a which are operable to positively prevent movement of the carriers 20 past pre-selected desired stop positions on the rails 18 and 22. Each stop member 50 is movable between the stop position illustrated in FIG. 2 in solid lines and a disabled position illustrated in broken lines in which the stop member cannot interfere with movement of a carrier 20 in an advancing direction. This disabling of a stop member 50 is in response to retraction of the associated pusher bar 26 so that the disabling is always accomplished prior to an initial advance of a carrier 20 sufficient to move it past the stop members 50 or 50a which have held it in a stop position before those stop members are again held in stop positions.

It will be understood that the specific construction of the improved carrier stop which is herein disclosed and described is presented for purposes of explanation and illustration and is not intended to indicate limits of the invention, the scope of which is defined by the following claims.

What is claimed is:

1. In work handling apparatus which includes a frame, horizontal rail means on said frame, movable elements supported on said rail means for horizontal movement thereon, and reciprocating pusher means mounted for pushing engagement with said elements for advancing said elements horizontally in one direction on said rail means; a stop member engageable with a movable element for stopping it in a predetermined position on said rail means, means pivotally mounting said stop member on a stationary support for swinging movement between a first position in the path of an advancing element and a pivotally moved second position out of the path of travel of the movable element, and means movable in response to travel of said reciprocating pusher means in said one direction into a position holding said stop member in said first position.

2. In work handling apparatus which includes a frame, horizontal rail means on said frame, movable elements supported on said rail means for horizontal movement thereon, and a horizontally disposed reciprocatable pusher bar having pivotally mounted pusher dogs carried thereon for pushing engagement with said elements for advancing said elements horizontally in one direction on said rail means; a stop member engageable with a movable element in a predetermined position thereof for terminating the advance thereof, means mounting said stop member on said frame for swinging movement about a horizontal axis to a vertical position in which one end of the stop member is in the path of an advancing element, and means on said pusher bar engageable with said stop member adjacent the opposite end thereof for maintaining it in said vertical position for positively preventing movement of the element past said stop position on movement of said pusher bar in said one direction.

3. In work handling apparatus which includes a frame, horizontal rail means on said frame for supporting work carrying elements for horizontal movement on said rail means, and element transfer means on said frame engageable with said elements for advancing said elements horizontally in one direction on said rail means; stop means pivotally mounted on a stationary support, and means carried by said transfer means and engageable with said stop means for holding the stop means in a position positively blocking movement of an element in one direction past a predetermined stop position.

4. In work handling apparatus which includes a frame, horizontal rail means on said frame, movable elements supported on said rail means for horizontal movement thereon, and a horizontally disposed reciprocatable pusher bar having pivotally mounted pusher dogs carried thereon for pushing engagement with said elements for advancing said elements horizontally in one direction on said rail means; a stop member pivotally mounted on said frame for swinging movement about a substantially horizontal axis to an upright position in which the lower end of the stop member positively blocks movement of a movable element in one direction past a predetermined stop position, and means on said pusher bar engageable with the upper end of the stop member to prevent rotation thereof in a direction permitting advance of a movable element past said stop member, said means being so engageable with said stop member only in the position said pusher bar occupies at the time it has moved said movable element into said stop position.

5. An apparatus which includes a frame, horizontal rail means on said frame, movable elements supported on said rail means for horizontal movement thereon, and a horizontally disposed reciprocatable pusher bar having pivotally mounted pusher dogs carried thereon for pushing engagement with said elements for advancing said elements horizontally in one direction on said rail means; a stop member pivotally mounted on said frame for swinging movement about a substantially horizontal axis between a substantially vertical position in which the lower end thereof is in the path of travel of said movable elements and a rotated position out of the path of elements being advanced on said rail means, and means mounted on said pusher bar adjacent one of said dogs for engagement with the upper end of said stop member to prevent movement thereof to said rotated position, said means being arranged on said pusher bar so that it is engageable with said stop member upper end at substantially the same time that a movable element has been moved by said one dog into engagement with the lower end of said stop member.

6. In work handling apparatus which includes a frame, horizontal rail means on said frame for supporting work-carrying elements for horizontal movement on said rail means, and a horizontally disposed reciprocatable pusher bar having a pivotally mounted pusher dog carried thereon for pushing engagement with one of said elements for advancing said element horizontally in one direction on said rail means; a stop member pivotally mounted on said frame for swinging movement about a substantially horizontal axis between a substantially vertical stop position in which the lower end of the stop member is in the path of travel of said element moving on said rail means in one direction and a rotated position out of the path of said element, and means mounted on said pusher bar at a position spaced in said one direction from said pusher dog and engageable with the upper end of said stop member for releasably maintaining said stop member in said stop position.

7. In work handling apparatus which includes a frame, horizontal rail means on said frame for supporting work-carrying elements for horizontal movement on said rail means, and a horizontally disposed reciprocatable pusher bar having pivotally mounted pusher dogs carried thereon for pushing engagement with said elements for advancing said elements horizontally in one direction on said rail means; a stop member pivotally mounted on said frame for swinging movement about a substantially horizontal axis between a substantially vertical stop position in which the lower end of the stop member is engageable with an element being moved in said one direction on said rail means by one of said pusher dogs and a rotated position out of the path of said elements, and a member adjustably mounted on said pusher bar at a position spaced in said one direction from said one pusher dog and engageable with the upper end of said stop member, said adjustably mounted member being adjustable in said one direction.

8. In work handling apparatus which includes a frame, horizontal rail means on said frame for supporting work-carrying elements for horizontal movement on said rail means, and a horizontally disposed reciprocatable pusher bar having pivotally mounted pusher dogs carried thereon for pushing engagement with said elements for advancing said elements horizontally in one direction on said rail means; a first stop member pivotally mounted on said frame to one side of said pusher bar for swinging movement about a substantially horizontal axis between a substantially vertical stop position in which the lower end of the stop member is in the path of travel of and engageable with an element being moved on said rail means in said one direction by one of said pusher dogs, and a rotated position out of the path of said element, a first holding member mounted on said pusher bar at a position spaced in said one direction from said one pusher dog and engageable with the upper end of said stop member for holding said one stop member in said stop position in a position of said pusher bar extended in said one direction, a second stop member substantially identical to said first stop member and spaced from said first stop member in said one direction, said second stop member being disposed on the opposite side of said pusher bar and being movable to a substantially vertical stop position in which the lower end thereof is in the path of travel and engageable with an element being moved on said rail means in said one direction by another one of said pusher dogs and a rotated position out of the path of said element, a second holding member mounted on said pusher bar on said opposite side thereof at a position engageable with the upper end of said second stop member in said stop position in said position of said pusher bar extended in said one direction, said pusher bar being retractable to a position in which said second dog is movable into a position in which it will engage and push said first mentioned element in said one direction on a subsequent extension of said pusher bar in said one direction.

References Cited in the file of this patent

UNITED STATES PATENTS

| | | |
|---|---|---|
| 1,522,116 | Gray et al. | Jan. 6, 1925 |
| 1,584,031 | Hannauer et al. | May 11, 1926 |
| 2,421,690 | Ensor et al. | June 3, 1947 |
| 2,428,856 | Sinclair | Oct. 14, 1947 |
| 2,575,396 | Schenk | Nov. 20, 1951 |
| 2,624,440 | Hornberger | Jan. 6, 1953 |
| 2,736,441 | Hauck | Feb. 28, 1956 |
| 2,738,888 | Todd et al. | Mar. 20, 1956 |
| 2,832,297 | Daniels | Apr. 29, 1958 |
| 2,863,398 | Granath | Dec. 9, 1958 |